United States Patent [19]

Chang et al.

[11] Patent Number: 5,091,073
[45] Date of Patent: Feb. 25, 1992

[54] CRYSTALLINE MOLECULAR SIEVE COMPOSITIONS MCM-37

[75] Inventors: Clarence D. Chang; Cynthia T. W. Chu, both of Princeton; Ralph M. Dessau, Edison; John B. Higgins, Titusville; John D. Lutner, Hamilton Square; John D. Schlenker, Pennington, all of N.J.

[73] Assignee: Mobil Oil Corp., Fairfax, Va.

[21] Appl. No.: 552,269

[22] Filed: Jul. 13, 1990

[51] Int. Cl.$^5$ .................. C10G 47/04; C01B 25/36
[52] U.S. Cl. .................. 208/46; 423/305; 423/306; 423/328; 208/111; 208/134; 208/137; 208/138; 208/208 R; 208/213; 208/217; 585/640; 585/408; 585/502; 585/509; 585/252
[58] Field of Search ............ 423/305, 306, 328, 329, 423/277, 279; 502/208, 214; 208/46, 111, 134, 137, 138, 213, 217, 208 R; 585/640, 408, 502, 509, 252

[56] References Cited

U.S. PATENT DOCUMENTS

| | | | |
|---|---|---|---|
| 3,355,246 | 11/1967 | Kuehl | 23/113 |
| 3,791,964 | 2/1974 | Kuehl | 208/120 |
| 3,801,704 | 4/1974 | Kobayashi et al. | 423/309 |
| 4,310,440 | 1/1982 | Wilson et al. | 252/435 |
| 4,440,871 | 4/1984 | Lok et al. | 502/214 |
| 4,473,663 | 9/1984 | Patton et al. | 502/208 |
| 4,486,397 | 12/1984 | Eshraghi et al. | 423/306 |
| 4,673,559 | 6/1987 | Derouane et al. | 423/306 |
| 4,683,217 | 7/1987 | Lok et al. | 502/214 |
| 4,684,617 | 8/1987 | Lok et al. | 502/214 |
| 4,686,092 | 8/1987 | Lok et al. | 423/306 |
| 4,686,093 | 8/1987 | Flanigen et al. | 423/306 |
| 4,704,478 | 11/1987 | Olson | 568/388 |
| 4,880,611 | 11/1989 | von Ballnoos et al. | 423/306 |
| 4,880,760 | 11/1989 | Pellet et al. | 502/67 |

FOREIGN PATENT DOCUMENTS 158348 10/1985 European Pat. Off. .
158349 10/1985 European Pat. Off. .
158350 10/1985 European Pat. Off. .
158976 10/1985 European Pat. Off. .
158977 10/1985 European Pat. Off. .

OTHER PUBLICATIONS

Lok et al., "The Role of Organic Molecules in Molecular Sieve Synthesis", Zeolites vol. 3, 1983, pp. 282-290.
Davis, M. E. et al., "A molecular sieve with eighteen-membered rings", Nature 331:698-699 (1988).
Lok, B. M., et al., "Silicoaluminophosphate Molecular Sieves: Another New Class of Microporous Crystalline Inorganic Solids", J. Am. Chem. Soc. 106:6092-6093.
Wilson, S. T., et al., "Aluminophosphate Molecular Sieves: A New Class of Microporous Crystalline Inorganic Solids", J. Am. Chem. Soc. 104:1146-1147 (1982).
Baerlocher, Ch. and Barrer, R. M., "The structure of the synthetic zeolite (K,Ba)-G,L", Zeitschrift für Kristallographie 136:245-254 (1972).

Primary Examiner—R. Bruce Breneman
Attorney, Agent, or Firm—Alexander J. McKillop; Charles J. Speciale; Dennis P. Santini

[57] ABSTRACT

This invention relates to a novel synthetic crystalline molecular sieve composition, MCM-37, which may contain framework +3 valence element, e.g. aluminum, and +5 valence element, e.g. phosphorus or with an addition +4 valence element, e.g. silicon, and to use thereof as a support and in catalytic conversion of organic compounds. The crystalline composition of this invention can easily be converted to catalytically active material.

14 Claims, 3 Drawing Sheets

CRYSTALLINE MOLECULAR SIEVE COMPOSITIONS MCM-37

BACKGROUND OF THE INVENTION

This invention relates to a novel synthetic crystalline molecular sieve material, MCM-37, which may contain framework +3 valence element, e.g. aluminum and +5 valence element, e.g. phosphorus, or with an additional +4 valence element, e.g. silicon, and to use thereof in catalytic conversion of organic compounds. The crystalline material can easily be converted to catalytically active material. It can also be used as a support material.

DESCRIPTION OF THE PRIOR ART

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g. $AlO_4$, in which the tetrahedra are cross-linked by the sharing of oxygen atoms whereby the ratio of the total Group IIIB element, e.g. aluminum, and silicon atoms to oxygen atoms is 1:2. The electrovalence of the tetrahedra containing the Group IIIB element is balanced by the inclusion in the crystal of a cation, for example, an alkali metal or an alkaline earth metal cation. This can be expressed wherein the ratio of the Group IIIB element to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724, 4,073,865 and 4,104,294 describe crystalline silicate of varying alumina and metal content.

Aluminum phosphates are taught, for example, in U.S. Pat. Nos. 4,310,440 and 4,385,994. These aluminum phosphate materials have essentially electroneutral lattices. U.S. Pat. No. 3,801,704 teaches an aluminum phosphate treated in a certain way to impart acidity. Aluminophosphates are also described by Wilson, S. T. et al. in the Journal of the American Chemical Society 104, 1146–1147 (1982).

An early reference to a hydrated aluminum phosphate which is crystalline until heated at about 110° C., at which point it becomes amorphous, is the "$H_1$" phase or hydrate of aluminum phosphate of F.d'Yvoire, *Memoir Presented to the Chemical Society*. No. 392, "Study of Aluminum Phosphate and Trivalent Iron", July 6, 1961 (received), pp. 1762–1776. This material, when crystalline, is identified by the Joint Commission for Powder Diffraction Standards (JCPDS), card number 15-274. Once heated at about 110° C., however, the d'Yvoire material becomes amorphous or transforms to the aluminophosphate form of tridymite.

A naturally occurring, highly hydrated basic ferric oxyphosphate mineral, cacoxenite, is reported by Moore and Shen, *Nature*, Vol. 306, No. 5941, pp. 356–358 (1983) to have a framework structure containing very large channels with a calculated free pore diameter of 14.2 Angstroms. R. Szostak et al., *Zeolites: Facts, Figures, Future*, Elsevier Science Publishers B.V., 1989, present work showing cacoxenite as being very hydrophilic, i.e. adsorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorus, i.e. silicoaluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. Nos. 4,673,559 (two-phase synthesis method); 4,880,611 (MCM-9); 4,623,527 (MCM-10); 4,639,358 (MCM-1); 4,647,442 (MCM-2); 4,664,897 (MCM-4); and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Pat. No. 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other references teaching aluminum phosphates include U.S. Pat. Nos. 4,365,095; 4,361,705; 4,222,896; 4,210,560; 4,179,358; 4,158,621; 4,071,471; 4,014,945; 3,904,550 and 3,697,550. Since their neutral framework structure is essentially void of ion-exchange properties, they are used as catalyst supports or matrices.

For a period of time, the largest molecular sieves contained 12-membered rings with an associated pore opening of about 7.4 Å. Recently, however, the search for larger pore molecular sieves resulted in the discovery of molecular sieves with pores larger than that of 12-membered rings. It is also well known that each molecular sieve has a distinctive X-ray diffraction pattern.

U.S. Pat. No. No. 4,310,440 describes aluminophosphates including a structure designated AlPO₄-8 which has a distinctive X-ray diffraction pattern having a significant interplanar d-spacing at 13.6-13.3 Angstroms. AlPO₄-8 is believed to have a 14-membered ring.

Davis, et al. describe an aluminophosphate-based molecular sieve with an 18-membered ring designated VPI-5 Nature 331, 362-366 (1988)).

U.S. Pat. No. No. 4,880,611 discloses a synthetic crystalline molecular sieve composition, MCM-9, which may contain framework +3 valence element, e.g. aluminum, +4 valence element, e.g. silicon, and +5 valence element, e.g. phosphorus. Its crystals have pore windows of about 12-13 Angstroms in diameter formed by 18 tetrahedral members and after heating at 110° C. or higher, display an X-ray diffraction pattern with interplanar d-spacings at 16.4±0.2, 8.2±0.1, 6.21±0.05, 6.17±0.05, 5.48±0.05, and 4.74±0.05 Angstroms without a significant interplanar d-spacing at 13.6-13.3 Angstroms.

SUMMARY OF THE INVENTION

The present invention is directed to a novel synthetic crystalline molecular sieve composition comprising a crystal having a framework topology giving a certain X-ray diffraction pattern which may contain one or more +3 valence elements, +5 valence elements and which may also include +4 valence elements and to its use as a support or as a catalyst component in catalytic conversion of organic, e.g. hydrocarbon, compounds.

The anhydrous crystalline composition of this invention has the general chemical formula:

wherein X is the +3 valence element, Y is the +5 valence element, Z is the +4 valence element, M is a cation of valence m, N is an anion of valence n, and x and y are numbers of from greater than −1 to less than +1 which satisfy the relationships:
(1) if x is 0, then y is not 0,
(2) if y is 0, then x is not 0, and
(3) x+y is greater than 0.001 and less than 1.

In the composition above, when x is greater than y, the present composition is a cation exchanger with potential use as an acidic catalyst. When x is less than y, it is an anion exchanger with potential use as a basic catalyst.

In the synthesized form of the present composition, it can also contain occluded organic material, D', and water molecules, entrapped during the synthesis and filling the microporous voids. It then has the general formula:

wherein v is the number of moles of D', occluded organic material resulting from organic directing agent (D), and/or solvent used in synthesis of and filling microporous voids of the composition, which material may be removed upon calcination, w is moles of H₂O, e.g. from 0 to about 5, and x and y are the numbers defined above. The MCM-37 crystalline material in the as-synthesized form has a characteristic x-ray diffraction pattern as set forth in Table 1A.

The present invention is a unique composition of matter which can be adjusted to exhibit a valuable combination of catalytic, sorption and ion-exchange properties and is also useful in fulfilling a support function.

DETAILED DESCRIPTION OF THE INVENTION

The composition of the present invention may comprise one or more +3 valence elements, such as those selected from the group consisting of aluminum, iron, chromium, vanadium, molybdenum, arsenic, antimony, manganese, gallium and boron; one or more +5 valence elements, such as those selected from the group consisting of phosphorus, arsenic, antimony and vanadium, and optionally one or more +4 valence elements, such as those selected from the group consisting of silicon, germanium and titanium in the structure thereof.

The composition of the present invention will exhibit unique and useful catalytic, sorptive and shape selective properties along with the presence of a +4 valence element/(+3 valence element plus +5 valence element), e.g. silicon/(aluminum+phosphorus), atomic ratio of less than unity, but greater than zero, e.g. from about 0.001 to 0.99. It is well recognized that aluminum phosphates exhibit a phosphorus/aluminum atomic ratio of only 0.8 to 1.2 and contain essentially no structural silicon. Also, the phosphorus-substituted zeolite compositions, sometimes referred to as "aluminosilicophosphate zeolites", have a silicon/aluminum atomic ratio of from 0.66 to 8.0, and a phosphorus/aluminum atomic ratio of from greater than 0 to 1.0.

The original cations of the as-synthesized present composition can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the composition catalytically active or control catalytic activity, especially for hydrocarbon conversion. These include hydrogen, rare earth metal and metals of Groups IA, IIA, IIIA, IVA, IB, IIB, IIIB, IVB, VIB and VIII of the Periodic Table of the Elements.

Typical ion exchange technique would be to contact the synthetic present composition with a salt of the desired replacing cation or cations. Examples of such salts include the halides, e.g. chlorides, nitrates and sulfates.

Framework topologies of the present composition containing +5 valence element, e.g. phosphorus, and +3 valence element, e.g. aluminum, in tetrahedrally coordinated structural positions along with which +4 valence element, e.g. silicon which may be present are not those of layered materials, but are rigid 3-dimensional crystals.

The crystalline composition of the present invention can be beneficially thermally treated, either before or after ion exchange. This thermal treatment is performed by heating the composition in an atmosphere such as air, nitrogen, hydrogen, steam, etc., at a temperature of from about 300° C. to about 1100° C., preferably from about 350° C. to about 750° C., for from about 1 minute to about 20 hours. While subatmospheric or superatmospheric pressures may be used for this thermal treatment, atmospheric pressure is desired for reasons of convenience.

The present composition exhibits an X-ray diffraction pattern which distinguishes it from other prior crystalline compositions. The X-ray diffraction pattern of this composition may have the following characteristic values:

TABLE 1A

| Interplanar d-Spacings (A) | Relative Intensity |
|---|---|
| 16.41 ± 0.59 | s-vs |
| 14.12 ± 0.45 | s-vs |
| 5.68 ± 0.08 | vw-w | and more specifically the following characteristic values:

TABLE 1B

| Interplanar d-Spacings (A) | Relative Intensity |
|---|---|
| 16.41 ± 0.59 | s-vs |
| 14.12 ± 0.45 | s-vs |
| 8.98 ± 0.22 | w-m |
| 5.68 ± 0.08 | vw-w |
| 4.50 ± 0.05 | vw-w |
| 4.10 ± 0.04 | w-m | and even more specifically the following characteristic values:

TABLE 1C

| Interplanar d-Spacings (A) | Relative Intensity |
|---|---|
| 16.41 ± 0.59 | s-vs |
| 14.12 ± 0.45 | s-vs |
| 8.98 ± 0.22 | w-m |
| 8.88 ± 0.22 | w-m |
| 5.68 ± 0.08 | vw-w |
| 5.61 ± 0.08 | vw-w |
| 4.50 ± 0.05 | vw-w |
| 4.45 ± 0.05 | vw-w |
| 4.10 ± 0.04 | w-m |

Intensity scale is vw=0-20, w=20-40, m=40-60, s=60-80, and vs=80-100.

The X-ray diffraction lines in Tables 1A, 1B and 1C identify a crystal framework topology in the composition exhibiting large pore windows of approximately 14-membered ring size. The pores are at least about 8.5–9.0 Angstroms in diameter. These lines distinguish this topology from other crystalline aluminosilicate, aluminophosphate and silicoaluminophosphate structures. It is noted that the X-ray pattern of the present composition is void of a d-spacing value at 13.6–13.3 Angstroms with any significant intensity relative the strongest d-spacing value. If a d-spacing value in this range appears in a sample of the present composition, it is due to impurity and will have a weak relative intensity. The large pore "AlPO$_4$-8" of U.S. Pat. No. 4,310,440 has a d-spacing value at 13.6–13.3 Angstroms with medium-very strong relative intensity as reported in the patent.

These X-ray diffraction data were collected with conventional X-ray systems, using copper K-alpha radiation. The positions of the peaks, expressed in degrees 2 theta, where theta is the Bragg angle, were determined by scanning 2 theta. The interplanar spacings, d, measured in Angstrom units (A), and the relative intensities of the lines, I/I$_o$, where I$_o$ is one-hundredth of the intensity of the strongest line, including subtraction of the background, were derived from the experimental X-ray diffraction pattern. It should be understood that this X-ray diffraction pattern is characteristic of all the species of the present compositions. Ion exchange of cations with other ions results in a composition which reveals substantially the same X-ray diffraction pattern with some minor shifts in interplanar spacing and variation in relative intensity. Relative intensity of individual lines may also vary relative the strongest line when the composition is chemically treated, such as by dilute acid treatment. Other variations can occur, depending on the +4 valence element/+3 valence element, e.g. silicon/aluminum, and the +5 valence element/+3 valence element, e.g. phosphorus/aluminum, ratios of the particular sample, as well as its degree of thermal treatment. The relative intensities of the lines are also susceptible to changes by factors such as sorption of water, hydrocarbons or other components in the channel structure. Further, the optics of the X-ray diffraction equipment can have significant effects on intensity, particularly in the low angle region. Intensities may also be affected by preferred crystallite orientation.

The computed X-ray powder diffraction pattern of MCM-37 based on a structural model is shown in Table 1D. This structural model may not be correct in all respects but a theoretical X-ray powder pattern computed from the model reproduces the d-spacings and intensities observed on the experimental X-ray pattern to within the expected limits.

TABLE 1D

| 2Θ | Interplanar d-Spacing Å | Relative Intensities I/I % × 100 |
|---|---|---|
| 5.41 | 16.33 | 100.0 |
| 6.25 | 14.13 | 53.3 |
| 6.30 | 14.02 | 52.6 |
| 9.86 | 8.97 | 6.7 |
| 9.95 | 8.89 | 7.4 |
| 11.35 | 7.80 | >1.0 |
| 14.65 | 6.05 | 1.3 |
| 14.75 | 6.00 | 1.3 |
| 15.63 | 5.67 | 3.5 |
| 15.79 | 5.61 | 3.4 |
| 16.28 | 5.44 | 2.4 |

TABLE 1D-continued

| 2Θ | Interplanar d-Spacing Å | Relative Intensities I/I % × 100 |
|---|---|---|
| 17.24 | 5.14 | 2.2 |
| 17.30 | 5.13 | 2.0 |
| 19.79 | 4.49 | 2.9 |
| 19.80 | 4.48 | 1.5 |
| 19.91 | 4.46 | 1.3 |
| 19.98 | 4.44 | 2.9 |
| 20.39 | 4.36 | 1.6 |
| 20.43 | 4.35 | 1.4 |
| 21.66 | 4.10 | 24.0 |
| 21.76 | 4.08 | 4.7 |
| 21.89 | 4.06 | 4.8 |
| 22.37 | 3.97 | 1.8 |
| 22.60 | 3.93 | 2.3 |
| 22.60 | 3.93 | 5.3 |
| 22.61 | 3.93 | 2.1 |
| 22.61 | 3.93 | 2.1 |
| 22.71 | 3.92 | 1.9 |
| 22.77 | 3.91 | 5.3 |
| 22.81 | 3.90 | 7.2 |
| 25.12 | 3.54 | 4.6 |
| 25.23 | 3.53 | 4.5 |
| 25.42 | 3.50 | >1.0 |
| 28.29 | 3.15 | >1.0 |
| 29.52 | 3.03 | >1.0 |
| 29.72 | 3.01 | 2.1 |
| 29.89 | 2.99 | 2.1 |
| 31.69 | 2.824 | >1.0 |
| 32.88 | 2.724 | 2.4 |
| 33.42 | 2.681 | 1.0 |
| 33.51 | 2.674 | >1.0 |

The crystalline composition of this invention may be converted to the dry, hydrogen form by thermal treatment of the organic cation-containing form or hydrogen ion precursor-containing form resulting from ion exchange.

In general, the composition of the present invention can be prepared by any suitable means, such as, for example, from either a one-phase or a two-phase reaction mixture. Preparation in a one-phase system may comprise:

(1) providing a reaction mixture comprising sources of X oxide, Y oxide and Z oxide, wherein X represents one or more elements of +3 valence selected from the group consisting of, for example, aluminum, iron, chromium, vanadium, molybdenum, arsenic, antimony, manganese, gallium and boron; Y represents one or more elements of +5 valence selected from the group consisting of, for example, phosphorus, arsenic, antimony and vanadium; Z represents one or more elements of +4 valence selected from the group consisting of, for example, silicon, germanium and titanium, an organic directing agent D, inorganic ions M, and water, the components of said reaction mixture having the following relationship:

where a, b, c, d, f, n/q, and h are numbers satisfying the following relationships:
a/(c+d+e) is less than 4,
b/(c+d+e) is less than 2,
d/(c+e) is less than 2,
f/(c+d+e) is from 0.1 to 15,
g/(c+d+e) is less than 2, and
h/(c+d+e) is from 3 to 150.

wherein upon initial provision of said reaction mixture said oxide source unstable in the water is dispersed or dissolved in the water-immiscible organic solvent;

(2) heating said reaction mixture at a rate of from 5° C. to 200° C. per hour to a temperature of from 80° C. to 300°;

(3) agitating said reaction mixture in a manner sufficient to intimately admix the water-immiscible organic solvent and the water with each other, thereby progressively hydrolyzing the oxide source unstable in water;

(4) maintaining said agitated reaction mixture at a temperature of from 80° C. to 300° C. and a pH of from 2 to 9 until crystals of oxide material are formed; and (5) recovering from said reaction mixture a composition characterized, in the anhydrous state, as follows:

wherein D' represents the total of organic directing agent D plus organic solvent, v is the number of moles of D', m is the valence of cation M, n is the valence of anion N, and x and y are numbers of from greater than −1 to less than +1 which satisfy the relationships:

(1) if x is 0, then y is not 0,
(2) if y is 0, then x is not 0, and
(3) x+y is greater than 0.001 and less than 1.

Reaction conditions may comprise carefully heating the above reaction mixture at a rate of from 5° C. to 200° C. per hour to a temperature of from about 80° C. to about 300° C. for a period of time of from about 5 hours to about 500 hours until crystals of the present composition are formed. A more preferred temperature rang is from about 100° C. to about 200° C. with the amount of time at a temperature in such range being from about 15 hours to about 168 hours. During heating and maintaining the reaction mixture at the desired temperature, the pH must be carefully controlled to be from about 2 to about 12. Control of pH can be accomplished by adjusting the concentration of the added organic and/or inorganic base(s).

The reaction is carried out until crystals of the desired composition form. The crystalline product is recovered by separating same from the reaction medium, as by cooling the whole to room temperature, filtering and washing with water before drying.

A two-phase system may also be used as described in U.S. Pat. No. No. 4,647,442, which is incorporated herein by reference. In a two-phase system, the reaction mixture composition can be prepared utilizing materials which supply the appropriate components. In a two-phase system, the aqueous phase components may include from the sources of the +3, +4 or +5 valence elements, e.g. silicon, phosphorus, or aluminum, those not included in the water-immiscible, e.g. organic, phase. The organic phase comprises an organic solvent and a source of at least one of the +3, +4 or +5 valence elements, e.g. silicon, phosphorus, or aluminum, insoluble in the aqueous phase under reaction conditions. The aqueous phase also contains the required directing agent.

In either system, useful sources of +3 valence element, e.g. aluminum, as non-limiting examples, include any known form of oxide or hydroxide, organic or inorganic salt or compound. Useful sources of +4 valence element, e.g. silicon, include, as non-limiting examples, any known form of dioxide or silicic acid, alkoxy- or other compounds of such element. Useful sources of +5 valence element, e.g. phosphorus, include, as non-limiting examples, any known form of phosphorus acids or phosphorus oxides, phosphates and phosphites, and organic derivatives of such element.

The organic solvent is a $C_5$–$C_{10}$ alcohol or any other liquid compound substantially immiscible with water, as nonlimiting examples.

An organic directing agent can be selected from the group consisting of organic mono- or dialkylamines, alkyl being of 3 or 4 carbon atoms, and onium compounds having the following formula:

wherein R or R' is alkyl of from 1 to 20 carbon atoms, or combinations thereof; M is a tetracoordinate element (e.g. nitrogen, phosphorus, arsenic, antimony or bismuth); and X is an anion (e.g. fluoride, chloride, bromide, iodide, hydroxide, acetate, sulfate, carboxylate, etc.).

Particularly preferred directing agents for synthesis of the present composition include onium compounds, above defined, wherein R is alkyl of 1 to 4 carbon atoms, M is nitrogen and X is halide or hydroxide. Nonlimiting examples of these include tetrapropylammonium hydroxide, tetrabutylammonium hydroxide, tetraethylammonium hydroxide and tetrapropylammonium bromide; and dialkylamines wherein alkyl is propyl or butyl, also tetrabutylammonium bromide, 2-hydroxyethyl derivatives of morpholine, piperidine, and piperazine. Particularly preferred are n-dipropylamine, tetra(2-hydroxyethyl)ammonium hydroxide and tetrabutylammonium hydroxide.

The composition prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

It may be desired to incorporate the new composition with another material, i.e. a matrix, resistant to the temperatures and other conditions employed in various organic conversion processes. Such materials include active and inactive material and synthetic or naturally occurring zeolites as well as inorganic materials such as clays, silica and/or metal oxides, e.g. alumina. The latter may be either naturally occurring or in the form of gelatinous precipitates or gels including mixtures of silica and metal oxides. Catalyst compositions containing the present composition will generally comprise from about 1% to 90% by weight of the present composition and from about 10% to 99% by weight of the matrix material. More preferably, such catalyst compositions will comprise from about 2% to 80% by weight of the present composition and from about 20% to 98% by weight of the matrix.

Use of a material in conjunction with the new composition, i.e. combined therewith, which is active, tends to alter the conversion and/or selectivity of the overall catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It may be desirable to provide a catalyst having good crush strength because in commercial use it is desirable to prevent the catalyst from breaking down into powder-like materials. These clay binders have been employed normally only for the purpose of improving the crush strength of the overall catalyst.

Naturally occurring clays which can be composited with the new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the present composition can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline material and inorganic oxide gel matrix vary widely, with the crystal content ranging from about 1 to about 90 percent by weight and more usually, particularly when the composite is prepared in the form of beads, in the range of about 2 to about 80 weight percent of the composite.

Employing a catalytically active form of the present composition as a catalyst component, said catalyst possibly containing additional hydrogenation components, reforming stocks can be reformed employing a temperature of from about 370° C. to about 540° C., a pressure of from about 100 psig to about 1000 psig (791 to 6996 kPa), preferably from about 200 psig to about 700 psig (1480 to 4928 kPa), a liquid hourly space velocity is from about 0.1 to about 10, preferably from about 0.5 to about 4, and a hydrogen to hydrocarbon mole ratio of from about 1 to about 20, preferably from about 4 to about 12.

A catalyst comprising the present composition can also be used for hydroisomerization of normal paraffins, when provided with a hydrogenation component, e.g. platinum. Such hydroisomerization is carried out at a temperature of from about 90° C. to about 375° C., preferably from about 145° C. to about 290° C., with a liquid hourly space velocity of from about 0.01 to about 2, preferably from about 0.25 to about 0.50, and with a hydrogen to hydrocarbon mole ratio of from about 1:1 to about 5:1. Additionally, such a catalyst can be used for olefin or aromatic isomerization, employing a temperature of from about 200° C. to about 480° C.

Such a catalyst can also be used for reducing the pour point of gas oils. This reaction is carried out at a liquid hourly space velocity of from about 10 to about 30 and at a temperature of from about 425° C. to about 595° C.

Other reactions which can be accomplished employing a catalyst comprising the composition of this invention containing a metal, e.g. platinum, include hydrogenation-dehydrogenation reactions and desulfurization reactions, olefin polymerization (oligomerization) and other organic compound conversions, such as the conversion of alcohols (e.g. methanol) or ethers (e.g. dimethylether) to hydrocarbons, and the alkylation of aromatics (e.g. benzene) in the presence of an alkylating agent (e.g. ethylene).

Sorption capacities may be determined as follows:

A weighed sample of the calcined adsorbant is contacted with a flowing stream of the equilibrium vapor of the adsorbate at 25° C., admixed with dry nitrogen. Adsorbates are water vapor and benzene, n-hexane, 2-methylpentane, xylene or cyclohexane vapors. The sample temperature is maintained at 25° C. to 90° C. for adsorbates other than ortho-xylene which can be 120° C. and water for which it was 60° C. The increase in weight is measured gravimetrically and converted to the adsorption capacity of the sample in weight percent of calcined adsorbant.

Alpha Value may also be determined. When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078, in *The Journal of Catalysis*, 6, pp. 522-529 (Aug. 1965), and in *The Journal of Catalysis*, 61, p. 395 (1980), each incorporated herein by reference as to that description.

When ion-exchange capacity is examined, it is determined by titrating with a solution of sulfamic acid the gaseous ammonia evolved during the temperature programmed decomposition of the ammonium-form of the present composition. The method is described in *Thermochimica Acta*, Vol. III, pp. 113-124, 1971 by G. T. Kerr and A. W. Chester, incorporated herein by reference as to that description.

In order to more fully illustrate the nature of the invention and the manner of practicing same, the following examples are presented.

EXAMPLE 1

Figure 1:
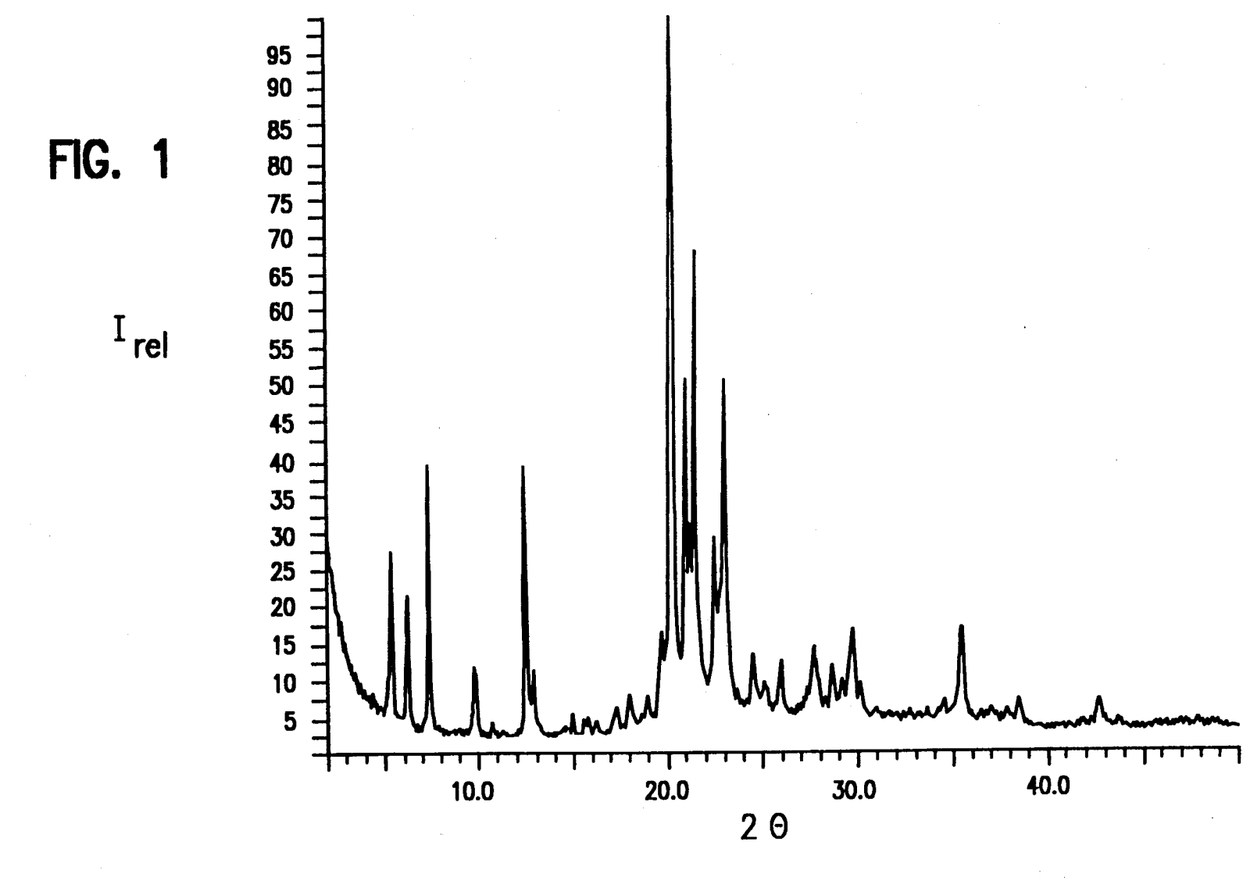
FIG. 1 shows the X-ray diffraction pattern of the Example 1 product.

A solution containing 23 g of 85% $H_3PO_4$ and 50 g water was mixed with 10.31 g of $Al_2O_3 \cdot nH_2O$ (Catapal SB alumina). To the mixture, 3 g of silica gel and 50.83 g of tetrapropylammonium hydroxide (TPAOH) (40 wt %) were added. The mixture was crystallized in a 300 cc. autoclave at 150° C. for 64 hours. The product was filtered, washed and calcined under air to 538° C. for 2 hours. Table 1 shows the X-ray powder diffraction data and FIG. 1 shows the X-ray diffraction pattern of the calcined material.

TABLE 1

D-values and relative intensities MCM-37 Preparation*
Lambda for this run: 1.54178 Angstroms

| Peak No. | 2 theta(°) | d-value(A) | Relative Intensity |
|---|---|---|---|
| 1 | 5.372 | 16.452 | 23.9 |
| (Peak at 5.372 2θ enhanced by impurity phase.) | | | |
| 2 | 6.238 | 14.169 | 20.5 |
| (Peak at 6.238 2θ is unresolved doublet.) | | | |
| Impurity Phase | 7.426 | 11.904 | 38.1 |
| 3 | 9.828 | 8.999 | 9.1 |
| 4 | 9.928 | 8.909 | 4.8 |
| Impurity Phase | 10.749 | 8.230 | 1.7 |
| 5 | 11.296 | 7.833 | >1.0 |
| Impurity Phase | 12.482 | 7.091 | 38.9 |
| Impurity Phase | 12.893 | 6.866 | 7.2 |
| 6 | 17.314 | 5.122 | 3.6 |
| 7 | 15.557 | 5.696 | 1.2 |
| 8 | 15.752 | 5.626 | 1.4 |

TABLE 1-continued

D-values and relative intensities MCM-37 Preparation*
Lambda for this run: 1.54178 Angstroms

| Peak No. | 2 theta(°) | d-value(A) | Relative Intensity |
|---|---|---|---|
| Impurity Phase | 18.049 | 4.915 | 4.4 |
| Impurity Phase | 18.717 | 4.741 | 1.0 |
| Impurity Phase | 18.999 | 4.671 | 3.0 |
| 9 | 19.767 | 4.491 | 10.9 |
| (Peak at 19.767 2θ enhanced by impurity phase.) | | | |
| 10 | 20.300 | 4.374 | 100.0 |
| (Peak at 20.300 2θ enhanced by impurity phase.) | | | |
| Impurity Phase | 20.954 | 4.239 | 45.8 |
| Impurity Phase | 21.189 | 4.193 | 22.1 |
| Impurity Phase | 21.447 | 4.143 | 65.6 |
| 11 (shoulder) | 21.662 | 4.102 | 8.1 |
| 12 | 22.483 | 3.954 | 20.5 |
| (Peak at 22.483 2θ enhanced by impurity phase.) | | | |
| Impurity Phase | 22.737 | 3.911 | 11.5 |
| Impurity Phase | 22.992 | 3.868 | 45.0 |
| Impurity Phase | 24.470 | 3.638 | 6.7 |
| Impurity Phase | 24.653 | 3.611 | 2.3 |
| 13 | 25.060 | 3.553 | 3.5 |
| 14 | 25.216 | 3.532 | 1.9 |

*This preparation is a mixture of several phases. Peaks due to the MCM-37 component are numbered consecutively.

EXAMPLE 2

A mixture containing 130.0 g of distilled water, 39.7 g of $Al_2O_3 \cdot nH_2O$ (Catapal alumina (74.5%)) and 70.7 g orthophosporic acid ($H_3PO_4$=85.7%) were mixed together and aged without stirring for 3 hours at 25° C.. 194.6 g of 40 wt % tetrabutylammonium hydroxide in $H_2O$ were then added and stirred for an additional 30 minutes at 25° C. The final gel (pH=5.5) was charged to a 300 cc autoclave equipped with a stainless steel liner, pressurized with 300 psig nitrogen and heated without stirring to 143° C. for 20 hours.

Figure 2:
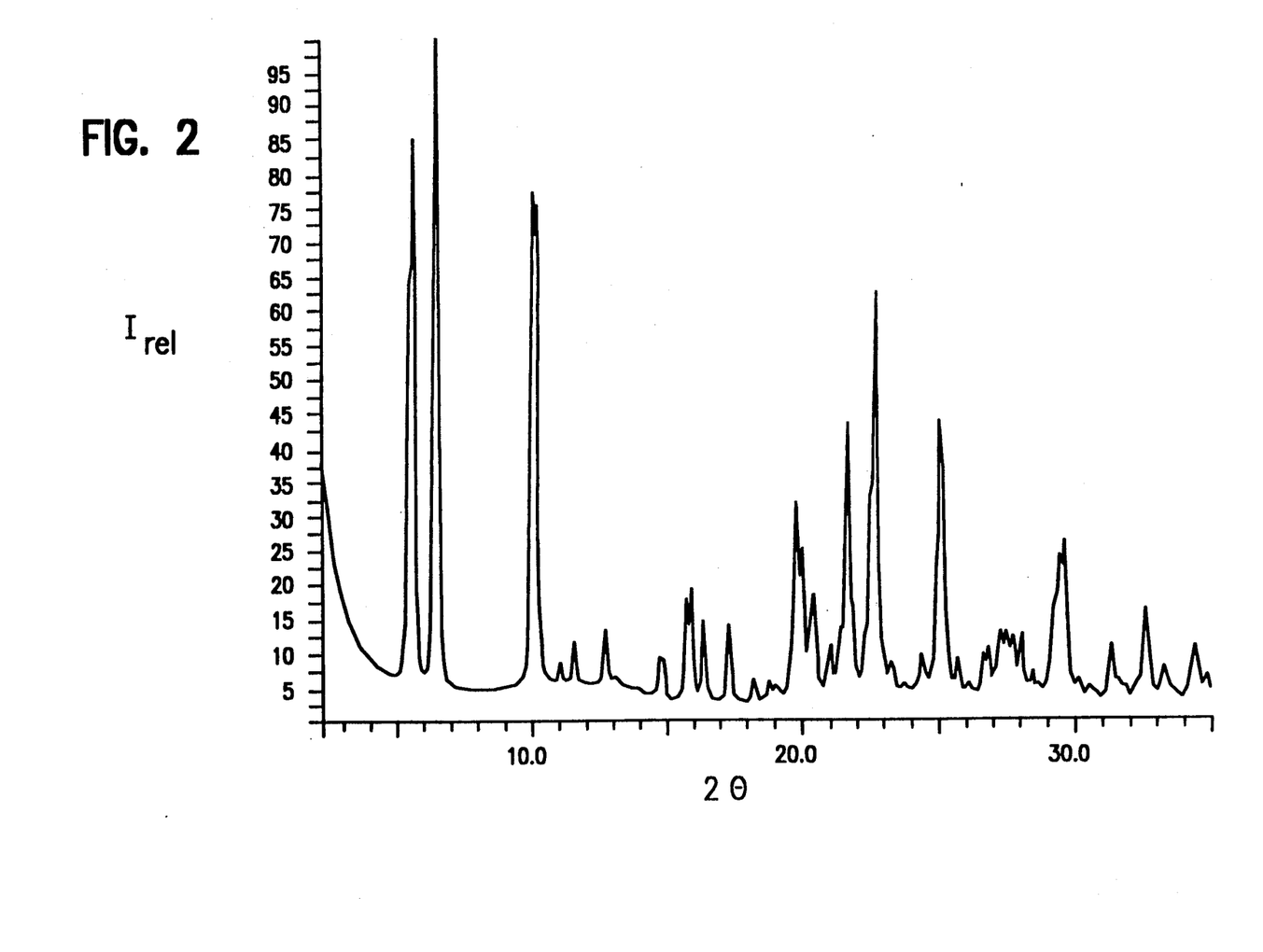
FIG. 2 shows the X-ray diffraction pattern of the Example 2 product.

After cooling, product was removed, washed and decanted using distilled $H_2O$ until a reasonably clear liquid wash was obtained. Some of the washed as-synthesized product was collected using a filter funnel assembly and dried in air at 130° C./3 hours. In addition, some of the still wet washed product was soxhlet extracted overnight using distilled water and dried again in air at 130° C./3 hours. Some of the extracted product was then calcined in air at 1° C./minute from 25° C. to 538° C. and held for 6 hours. Table 2 shows the X-ray powder diffraction data and FIG. 2 shows the X-ray diffraction pattern of this material.

TABLE 2

Tabulation of X-Ray Powder Diffraction Data for MCM-37 Preparation.
Lambda for this run = 1.54178 A.

| Peak | 2 theta | d-value | Relative Intensity |
|---|---|---|---|
| 01 | 5.394 | 16.383 | 78.4 |
| 02 | 6.264 | 14.110 | 100.0 (unresolved doublet) |
| 03 | 9.847 | 8.982 | 65.5 |
| 04 | 9.958 | 8.882 | 44.9 |
| Impurity Phase | 10.815 | 8.180 | 2.6 |
| 05 | 11.329 | 7.810 | 5.3 |
| Impurity Phase | 12.502 | 7.080 | 7.6 |
| 06 | 14.623 | 6.057 | 5.1 |
| 07 | 14.740 | 6.010 | 3.9 |
| 08 | 15.600 | 5.680 | 13.7 |
| 09 | 15.784 | 5.614 | 15.3 |
| 10 | 16.248 | 5.455 | 11.4 |
| 11 | 17.258 | 5.138 | 11.3 |
| Impurity Phase | 18.183 | 4.879 | 2.1 |
| Impurity Phase | 18.803 | 4.719 | 1.7 |

TABLE 2-continued

Tabulation of X-Ray Powder Diffraction Data for MCM-37 Preparation.
Lambda for this run = 1.54178 A.

| Peak | 2 theta | d-value | Relative Intensity |
|---|---|---|---|
| Impurity Phase | 18.983 | 4.675 | 0.8 |
| 12 | 19.745 | 4.496 | 25.7 |
| 13 | 19.956 | 4.449 | 17.8 |
| 14 | 20.344 | 4.365 | 13.1 |
| Impurity Phase | 21.015 | 4.227 | 5.0 |
| Impurity Phase | 21.429 | 4.146 | 5.2 |
| 15 | 21.682 | 4.099 | 35.9 |
| 16 | 21.871 | 4.064 | 6.7 |
| 17 | 22.351 | 3.977 | 3.1 |
| 18 | 22.563 | 3.941 | 22.0 |
| (Peak at 22.563 2θ enhanced by impurity phase.) | | | |
| 19 | 22.766 | 3.906 | 52.6 |
| (Peak at 20.766 2θ enhanced by impurity phase.) | | | |
| Impurity Phase | 23.369 | 3.808 | 1.9 |
| Impurity Phase | 24.476 | 3.637 | 3.4 |
| 20 | 25.075 | 3.551 | 33.5 |
| 21 | 25.214 | 3.532 | 21.1 |

EXAMPLE 3

Figure 3:
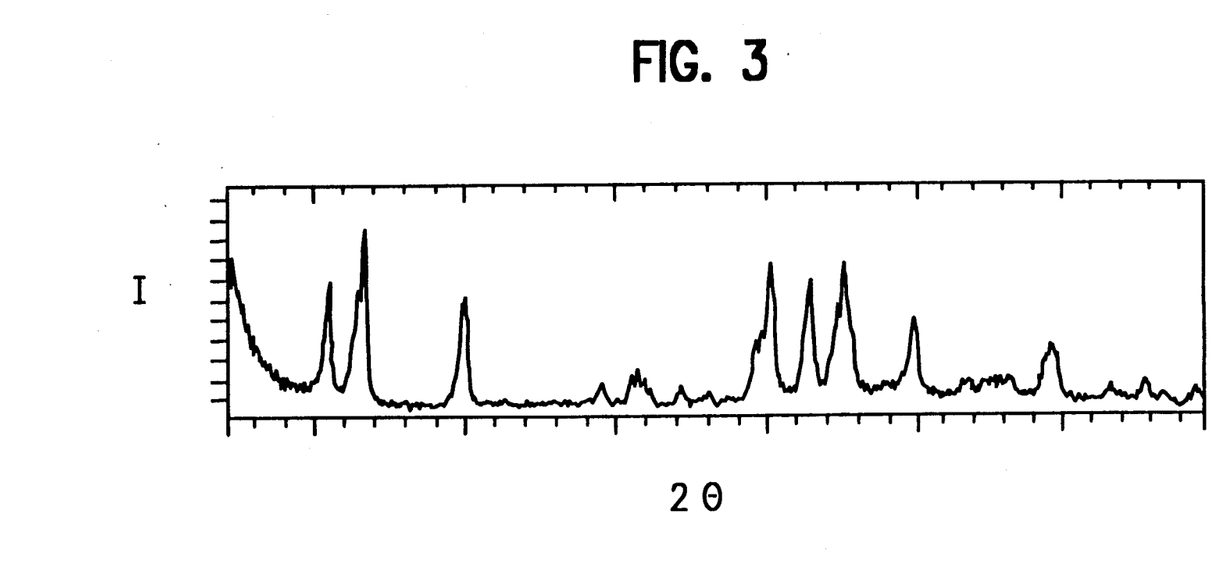
FIG. 3 shows the X-ray diffraction pattern of the Example 3 product.

A solution containing 115.25 g of 85% $H_3PO_4$ and 150.00 g water was mixed with 68.75 g $Al_2O_3 \cdot nH_2O$ (Catapal alumina) and aged for two hours at 80°–90° C. 6.0 g di-n-butylamine in 15 g water were then added. 40 g of the final gel (pH 5.0) were heated at 150° C. for 64 hours and calcined. FIG. 3 shows the X-ray diffraction pattern of the product material.

What is claimed is:

1. A composition of matter comprising crystals having a framework topology giving an x-ray diffraction pattern with interplanar d-spacings at 16.41±0.59 Angstroms, 14.12±0.45 Angstroms and 5.68±0.08 Angstroms and without a significant interplanar d-spacing at 13.6–13.3 Angstroms, said crystals having pore windows framed by 14 tetrahedral members.

2. The composition of claim wherein said crystals have a framework topology giving an X-ray diffraction pattern substantially as shown in Table 1B.

3. The composition of claim 1 wherein said crystals have a framework topology giving an X-ray diffraction pattern substantially as shown in Table 1C.

4. A composition of matter comprising crystals having a composition, on an anhydrous basis, as follows:

$$M_{x/m}{}^{m+}{:}(XO_2)_{1-y}{}^-{:}(YO_2)_{1-x}{}^+{:}(ZO_2)_{x+y}{:}$$
$$N_{y/n}{}^{n-}$$

wherein X is aluminum, Y is phosphorus, Z is silicon, M is a cation of valence m, N is an anion of valence n, and x and y are numbers of from greater than −1 to less than +1 which satisfy the relationships:

(1) if x is O, then y is not O,
(2) if y is O, then x is not O, and
(3) x+y is greater than 0.001 and less than 1, said crystals having pore windows formed by 14 tetrahedral members.

5. The composition of claim 4 wherein said crystals have a framework topology giving an X-ray diffraction pattern with interplanar d-spacings at 16.41±0.59 Angstroms, 14.12±0.45 Angstroms, and 5.68±0.08 Angstroms and without an interplanar d-spacing at 13.6–13.3 Angstroms.

6. The composition of claim 4 wherein M is selected from the group consisting of di-n-butylamine, and onium compounds of tetra propylammonium and tetrabutylammonium.

7. A composition of matter comprising crystals having a framework topology giving an X-ray diffraction pattern with interplanar d-spacings at 16.41±0.59 Angstroms, 14.12±0.45 Angstroms and 5.68±0.08 Angstroms, and without a significant interplanar d-spacing at 13.6–13.3 Angstroms, said crystals having pore windows framed by 14 tetrahedral members, having been synthesized by the method comprising:

(1) providing a reaction mixture comprising sources of X oxide, Y oxide and Z oxide, wherein X represents aluminum, Y represents phosphorus, and Z represents silicon, an organic directing agent D selected from the group consisting of tetrapropylammonium hydroxide, tetrabutylammonium hydroxide, tetrapropylammonium bromide, tetrabutylammonium bromide and di-n-butylamine, inorganic ions M, and water, the components of said reaction mixture having the following relationship:

$$(D)_a{:}(M_2O)_b{:}(X_2O_3)_c{:}(ZO_2)_d{:}(Y_2O_5)_e{:}(Solvent)_f{:}$$
$$(N)_g{:}(H_2O)_h$$

where a, b, c, d, e, f, g, and h are numbers satisfying the following relationships:
a/(c+d+e) is less than 4,
b/(c+d+e) is less than 2,
d/(c+e) is less than 2,
f/(c+d+e) is from 0.1 to 15,
g/(c+d+e) is less than 2, and
h/(c+d+e) is from 3 to 150, (2) heating said reaction mixture at a rate of from 5° C. to 200° C. per hour to a temperature of from 80° C. to 300° C.;

(3) maintaining said reaction mixture at a temperature of from 80° C. to 300° C. and a pH of from 2 to 9 until crystals of said composition of matter are formed; and (4) recovering from said reaction mixture said composition of matter.

8. The composition of matter of claim 7 having been synthesized by a method which further comprises calcining the recovered composition of matter.

9. The composition of matter of claim 7 having been synthesized by a method which further comprises calcining the recovered composition of matter in the presence of water.

10. The recovered composition of claim 7 characterized in the anhydrous state, as follows:

$$D'_v{:}M_{x/m}{}^{m+}{:}(XO_2)_{1-y}{}^-{:}(YO_2)_{1-x}{}^+{:}(ZO_2)_{x+y}{:}$$
$$N_{y/n}{}^{n-}$$

wherein D' represents the total of organic directing agent D plus organic solvent, v is the number of moles of D', m is the valence of cation M, n is the valence of anion N, and x and y are numbers of from greater than −1 to less than +1 which satisfy the relationships:

(1) if x is 0, then y is not 0,
(2) if y is 0, then x is not 0, and
(3) x+y is greater than 0.001 and less than 1.

11. The composition of claim 7 wherein said crystals have a framework topology giving an X-ray diffraction pattern substantially as shown in Table 1B.

12. The composition of claim 7 wherein said crystals have a framework topology giving an X-ray diffraction pattern substantially shown in Table 1C.

13. A process for effecting catalytic conversion of an organic compound-containing feedstock which comprises contacting said feedstock under catalytic conversion conditions with a catalyst comprising an active form of the composition of claim 1.

14. A process for effecting catalytic conversion of an organic compound-conversion feedstock which comprises contacting said feedstock under catalytic conversion conditions with a catalyst comprising an active form of the composition of claim 4.

* * * * *